(12) United States Patent
Pasic

(10) Patent No.: US 11,268,563 B2
(45) Date of Patent: Mar. 8, 2022

(54) FASTENER HOOK

(71) Applicant: Hewlett-Packard Development Company, L.P., Spring, TX (US)

(72) Inventor: Robert A Pasic, Puyallup, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 490 days.

(21) Appl. No.: 16/326,059

(22) PCT Filed: Sep. 2, 2016

(86) PCT No.: PCT/US2016/050044
§ 371 (c)(1),
(2) Date: Feb. 15, 2019

(87) PCT Pub. No.: WO2018/044316
PCT Pub. Date: Mar. 8, 2018

(65) Prior Publication Data
US 2021/0285482 A1    Sep. 16, 2021

(51) Int. Cl.
*F16B 39/02* (2006.01)

(52) U.S. Cl.
CPC ..................... *F16B 39/02* (2013.01)

(58) Field of Classification Search
CPC ...... F16B 37/043; F16B 37/044; F16B 39/02; F16B 39/103; F16B 39/108; F16B 39/32; F16B 41/002; Y10S 411/97; Y10S 411/969
USPC ........ 411/101, 103, 107, 111–113, 121–124, 411/141
See application file for complete search history.

(56) References Cited

U.S. PATENT DOCUMENTS

| 4,355,198 | A | 10/1982 | Gartland, Jr. | |
|---|---|---|---|---|
| 5,766,019 | A * | 6/1998 | Matsumoto | B60R 16/027 439/15 |
| 6,009,302 | A | 12/1999 | Worley | |
| 6,595,732 | B2 | 7/2003 | Werner et al. | |
| 6,796,760 | B1 * | 9/2004 | Tanner | F16B 41/002 411/104 |
| 7,544,028 | B2 * | 6/2009 | Tournier | F16B 37/046 411/121 |
| 7,824,118 | B2 | 11/2010 | Sugiyama | |
| 8,277,158 | B2 * | 10/2012 | Csik | F16B 37/046 411/111 |
| 8,882,424 | B2 | 11/2014 | Naruse | |
| 2005/0129461 | A1 | 6/2005 | Bruno | |
| 2009/0123220 | A1 * | 5/2009 | Chou | F16B 37/044 403/21 |
| 2009/0171396 | A1 | 7/2009 | Baynham et al. | |
| 2009/0257822 | A1 * | 10/2009 | Mudel | F16B 41/002 403/349 |

(Continued)

FOREIGN PATENT DOCUMENTS

GB      880218      10/1961

*Primary Examiner* — Roberta S Delisle
(74) *Attorney, Agent, or Firm* — Fabian VanCott

(57) ABSTRACT

A fastener retainer may include a surface, a hook integrated into the surface, and a fastener hole defined in the surface below the hook. A substrate may include a hook extending out of and integrated into a first side of the substrate, a screw hole defined through the substrate, and a countersink formed at least equal to the height of the hook on the first side of the substrate.

17 Claims, 6 Drawing Sheets

(56) References Cited

U.S. PATENT DOCUMENTS

| | | | |
|---|---|---|---|
| 2011/0024468 A1* | 2/2011 | Yeh | F16B 41/002 224/249 |
| 2014/0202676 A1* | 7/2014 | Wang | F16B 41/002 165/185 |
| 2015/0219134 A1 | 8/2015 | Yamaguchi | |
| 2015/0345536 A1* | 12/2015 | Schraer | F16B 37/044 411/111 |

\* cited by examiner

FASTENER HOOK

BACKGROUND

Repair servicepersons of many devices, including printers and other mechanical devices, may occasionally remove a part from the device in order to repair the device. This includes the removal of fasteners that hold the part to a surface of the device.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
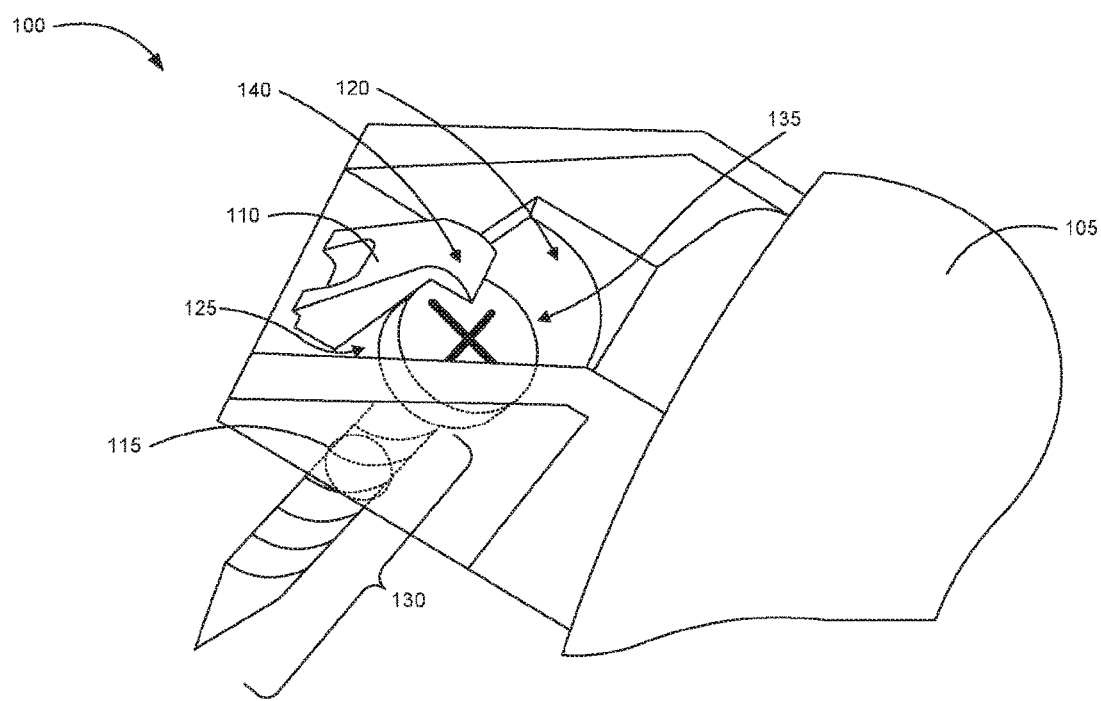
FIG. 1 is a diagram of a fastener retainer for retaining a fastener in a coupled state with respect to a surface, according to an example of the principles described herein.
Figure 2A:
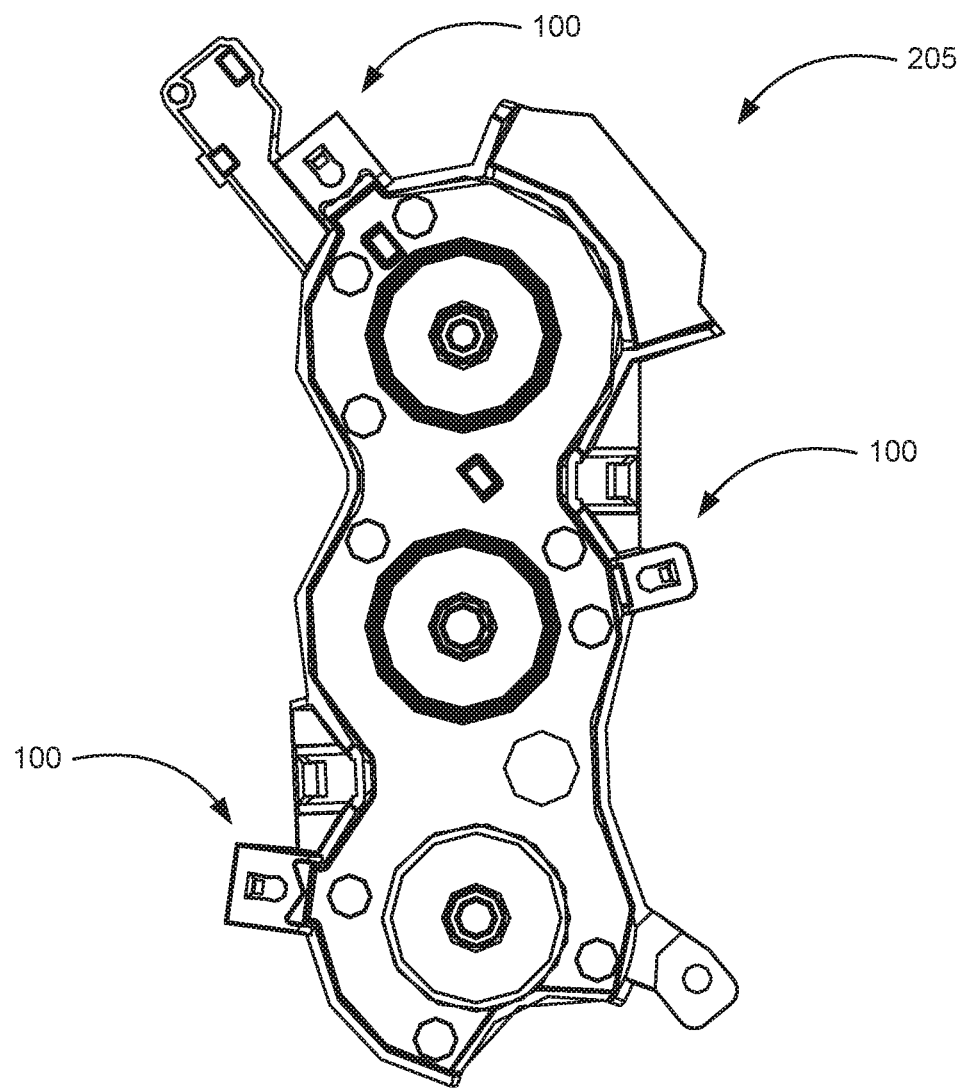
FIG. 2A-2D is a number of views of a sub-component of a device including a number of fastener retainers of FIG. 1, according to an example of the principles described herein.
Figure 2B:
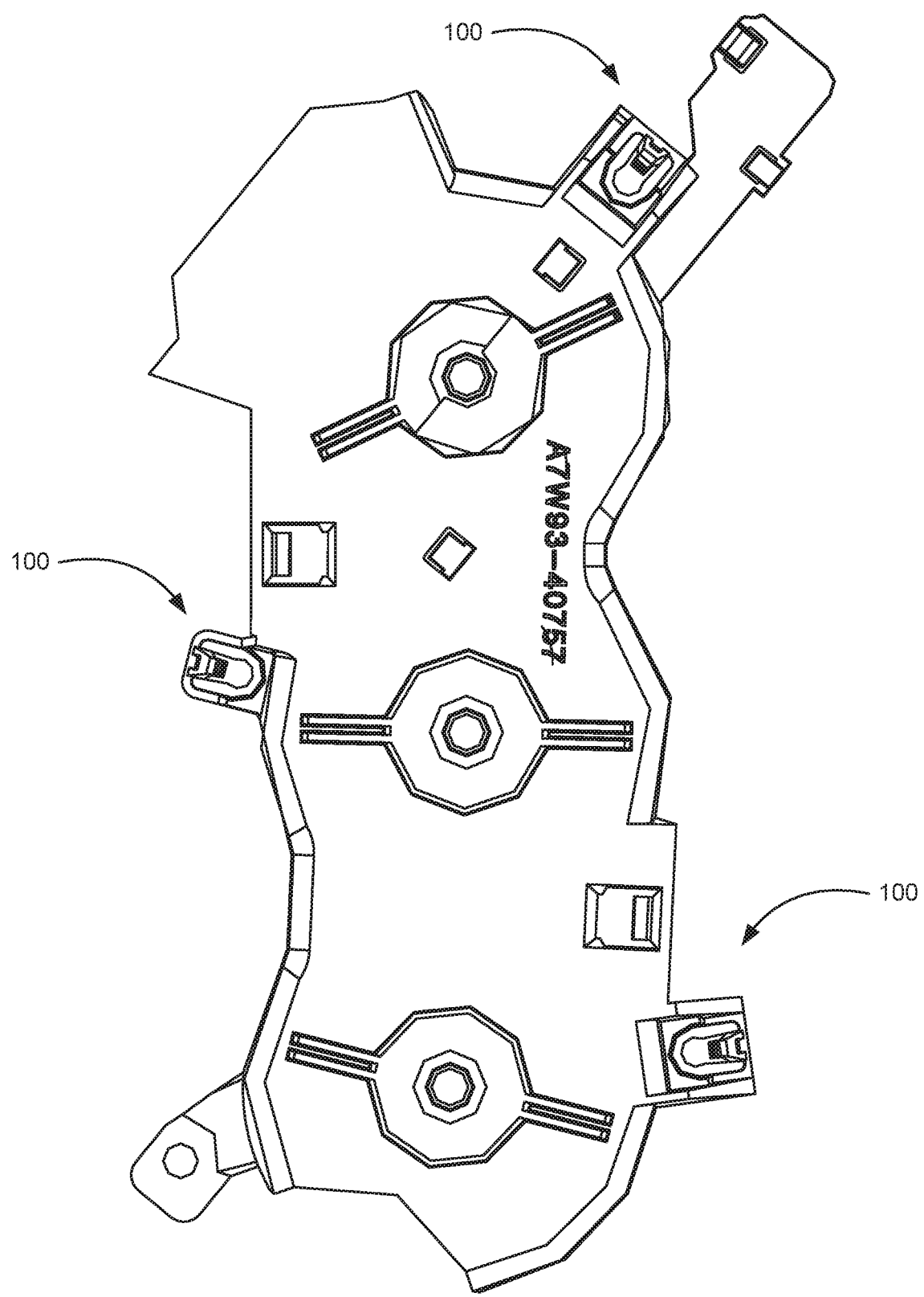
Figure 2C:
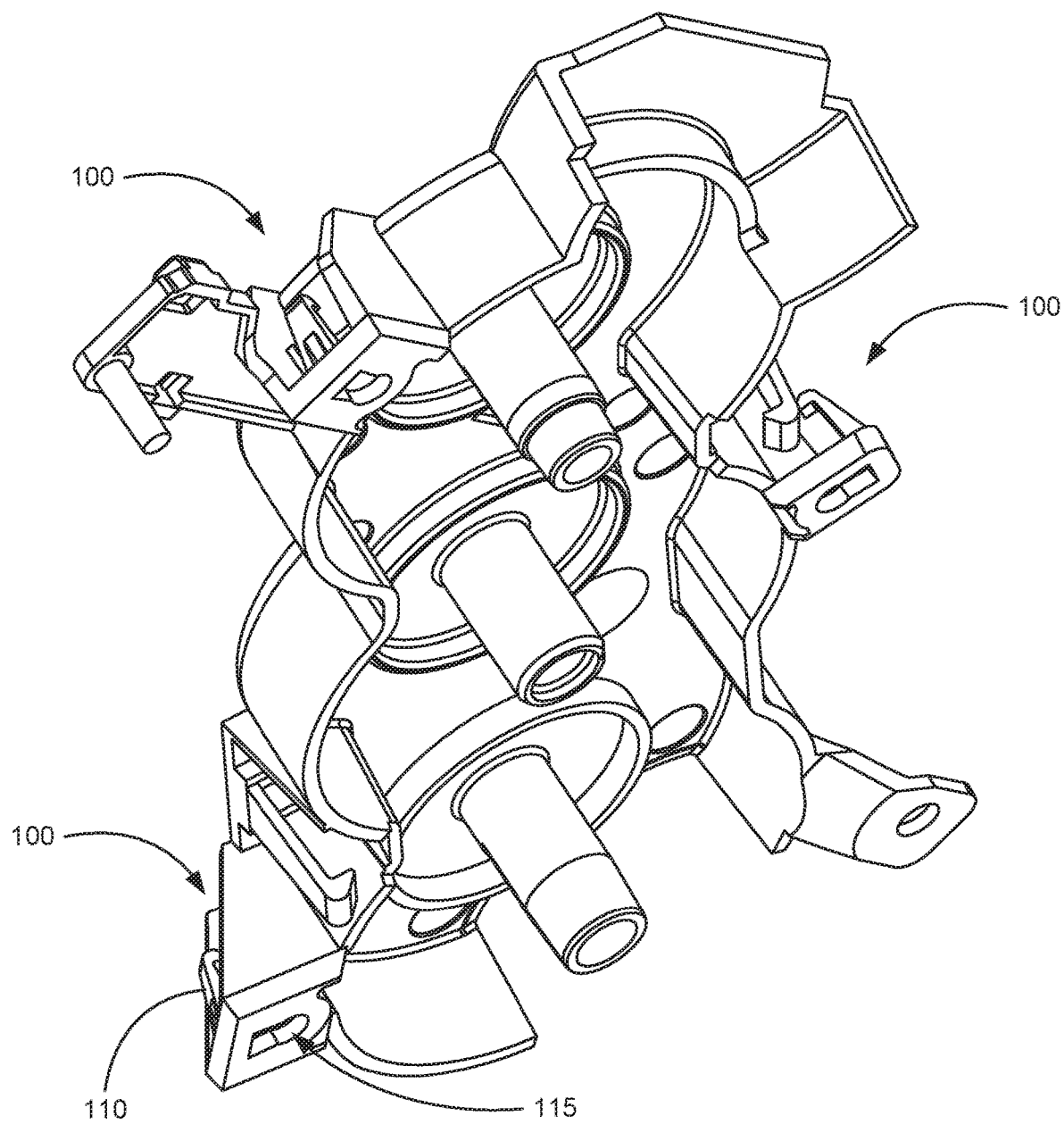
Figure 2D:
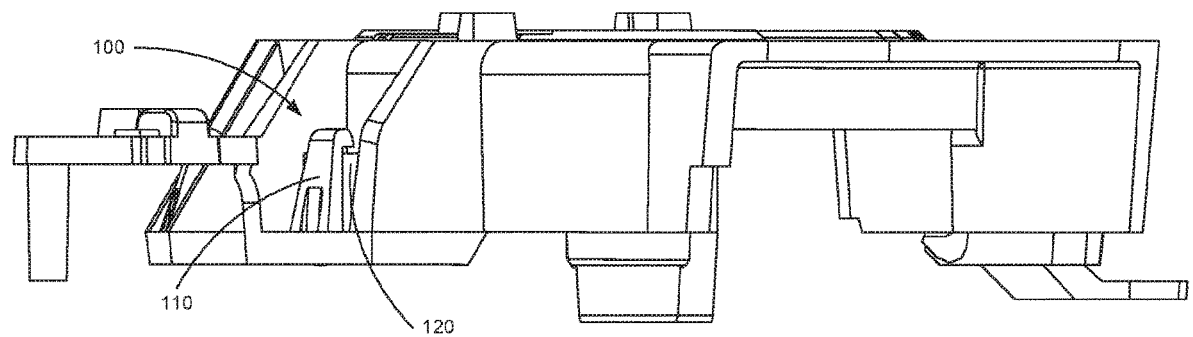

During repair of a device, servicepersons may remove various parts from the device either to gain access to another part of the device or replace the removed part. In this case, a number of fasteners such as screws or bolts may be removed in order to separate the part from the device. Where the part being removed is physically located inside the device and especially above other mechanical sub-components in the device a serviceperson runs the risk of accidentally dropping a fastener into the device and close to other mechanical sub-components in the device. If the device were to be turned on or otherwise activated, various moving parts may interact with the dropped fastener and be damaged as a result. This may result in user frustration, lost productivity by the owner of the device, and additional costs in repair or replacement of the device.

The present specification, therefore describes a fastener retainer that includes a surface, a hook integrated into the surface, and a fastener hole defined in the surface below the hook. The hook prevents disassembly of the fastener from the surface.

The present specification further describes a substrate that includes a hook extending out of and integrated into a first side of the substrate, a screw hole defined through the substrate, and a countersink formed at least equal to the height of the hook on the first side of the substrate.

The present specification also describes a hook that includes a top portion distal from a first surface of a substrate and a bottom portion proximal to the substrate relative to the top surface wherein the hook is integral to the first surface of the substrate, wherein the top portion allows a head of a screw to pass by and engage the first surface of the substrate, a threading portion of the screw passing through a hole defined in the substrate, and wherein the bottom portion prevents the head of the screw from passing above the top portion of the hook.

As used in the present specification and in the appended claims, the term "fastener" is meant to be understood as a device that secures one body to another. In an example, the fastener is a screw, bolt and nut, a blot, a nail or other similar type of device.

Additionally, as used in the present specification and in the appended claims, the term "resilient" is meant to be understood as able to recoil or spring back into shape after bending, stretching, or being compressed. In an example, a resilient body, device, and/or element can be moved temporarily and elastically returns to its previous position.

Even still further, as used in the present specification and in the appended claims, the term "a number of" or similar language is meant to be understood broadly as any positive number comprising 1 to infinity.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Turning now to the figures, FIG. 1 is a diagram of a fastener retainer (100) for retaining a fastener in a coupled state with respect to a surface, according to an example of the principles described herein. The fastener retainer (100) may be coupled to any surface (105). In an example, the fastener retainer (100) is integral with the surface (105). The fastener retainer (100) may include a hook (110), a fastener hole (115), and a countersink (120). Each of these will now be described in more detail.

The hook (110) may be defined on a first side of the surface (105). In an example, the hook (110) protrudes perpendicularly from any portion of the surface (105), The hook (110) may be defined close to a fastener hole (115) such that when a fastener (120 125) such as a screw is inserted into the fastener hole (115), the hook (110) cooperates with the countersink (120) to prevent the fastener (125) from de-coupling from the surface (105). This will be explained in more detail below. In an example, the hook (110) is made of a resilient material such that the hook (110) may be bent away from the fastener hole (115) and return to its original shape or position when force applied to bend it is no longer applied. In an example, the hook (110) is made of the same material as that making the surface (105). In an example, the hook (110) is made of a dissimilar material than that making the surface (105). In an example, the hook (110) is integral to the surface (105) and is formed by an extrusion process. In an example, the hook (110) is integral to the surface (105) and is formed using a molding process.

Providing a hook (110) that is integral to the surface (105) prevents additional parts from falling from the surface (105) during a disassembly process. For example, where the surface (105) is part of a sub-component in, for example, a printing device, disassembly of the fastener (125) will not also dislodge the hook (110). This prevents objects from falling into any mechanical portions of the printing device causing further time in finding the dropped parts. If the parts are not found, activation of the mechanical devices in the printing device may cause further damage to the printing device.

The countersink (120) may be formed at or around the fastener hole (115) to prevent the fastener (125) from decoupling from the surface (105). In an example, the countersink (120) is formed radially around the fastener hole (115). The countersink (120) provides a distance from the fastener hole (115) in order to accommodate the size of the fastener (125) including, for example, a head portion of a screw or nail. In an example, the countersink (120) extends radially around the fastener hole (115) in all directions around the fastener hole (115) except where the hook (110) is positioned. In the example of FIG. 1, the countersink (120) extends 180 degrees around the fastener hole (115) and opposite the hook (110). By positioning the countersink (120) as shown in FIG. 1, a fastener (125) may be prevented from decoupling from the surface (105). In an example, the countersink (120) comprises a number of radially formed pegs formed around the fastener hole (115). Other example countersinks (120) exist to prevent a fastener (125) from decoupling from the surface (105) via the fastener retainer (100) once installed. The present specification contemplates these other examples.

The surface (105) may be any surface of a part or element to be coupled to a device. In an example, the surface (105) is a subcomponent of a device installed or to be installed in the device. For example, the surface (105) may form part of a sub-component of a printing device. When the sub-component is installed in the printing device, a fastener (125) such as a screw may secure the sub-component to another component or chassis of the printing device.

During installation of the fastener (125) into the fastener retainer (100), a shaft portion (130) of the fastener (125) may be inserted into a first end of the fastener hole (115) proximate to the side of the surface (105) where the hook (110) and countersink (120) are formed. A head portion (135) of the fastener (125) may be passed by a slopped portion (140) of the hook (110) defined on a top portion of the hook (110). In an example, this may be done by pushing the top portion of the hook (110) away from the fastener hole (115) to allow the head portion (135) to pass under the hook (110). In an example, the hook (110) may be pushed out of the way by applying pressure to a top portion of the head portion (135) causing a bottom lip portion of the head portion (135) to follow the slopped surface of the top portion of the hook (110). Because the head portion is supported by the countersink feature, the head portion (135) of the fastener (125) will not move laterally and the force on the head portion (135) will cause the hook (110) to be laterally pushed out of the way. Once the head portion (135) clears the hook (110), the resiliency of the material that the hook (110) is made of causes the hook (110) to return to its original position.

As the fastener (125) is installed as described above, a portion of the shaft portion (130) of the fastener (125) may slidably extend out of a second end of the fastener hole (115) opposite the side of the surface (105) with the hook (110) and countersink (120). This allows the shaft portion (130) of the fastener (125) to engage with other surfaces such as the chassis or another sub-component of the example printing device as described above.

As the fastener (125) is disengaged from the other surface, the fastener (125) is not decoupled from the surface (105). Instead, as the shaft portion (130) of the fastener (125) disengages with the other surface, the head portion (135) of the fastener (125) advances away from the top of fastener hole (115) and advances into a space between the surface (105) and the hook (110) such that disengagement of the shaft portion (130) with the other surface is completed. However, the fastener (125) is prevented from completely exiting the fastener retainer (100) due to the lower surface of the hook (110) and the countersink (120) preventing disablement of the fastener (125) from the surface (105). In an example, the distance from the top side of the surface (105) where the hook (110) projects from the surface (105) and the bottom side of the hook (110) is shorter than the length of the fastener (125). In an example, the distance from the top side of the surface (105) where the hook (110) projects from the surface (105) and the bottom side of the hook (110) is longer than the length of the fastener (125), In an example, the length of the hook (110) measured from the surface (105) to the top of the hook (110) is longer than the length of the fastener (125). In an example, the length of the hook (110) measured from the surface (105) to the top of the hook (110) is shorter than the length of the fastener (125).

Although the above examples describe the use of the fastener retainer (100) in the context of a sub-component in a printing device, it is understood that this is simply an example. The present specification contemplates the use of the fastener retainer (100) with its hook (110), countersink (120), and fastener hole (115) with any type of surface (105). Consequently, the surface (105) can be any surface (105) that is to be attached or coupled to another surface. The present specification contemplates the use of the fastener retainer (100) described herein for those purposes.

Additionally, the fastener (125) described above and shown in FIG. 1, is depicted as being a screw or having a threaded shaft portion (130). Although the fastener (125) described herein may be a screw with a threaded shaft portion (130), other types of fasteners are contemplated in the present specification.

FIGS. 2A-2D are a number of views of a sub-component of a device including a number of fastener retainers (100) of FIG. 1, according to an example of the principles described herein. Specifically, FIGS. 2A-2D are include a top view, bottom view, isometric view, and front view, respectively, of a sub-component of a device including a number of fastener retainers (100) of FIG. 1, according to an example of the principles described herein. As described above, the fastener retainer (100) may be incorporated into a number of surfaces (105) such as sub-components of a device. In the example shown in FIG. 2, a printing device gear cover (205) may include three fastener retainers (100). The fastener retainers (100) may each be situated on the gear cover (205) so as to provide a conduit for a fastener (125) to pass therethrough and mate with corresponding portions of the printing device such as a chassis or other sub-components of the printing device.

In an example, the fastener (125) is a bolt which, after being installed into the fastener retainer (100) as described above, may interface with a nut coupled to the chassis or other sub-component of the printing device. The bolt in this example may have a length sufficient to pass entirely though the surface (105) of the gear cover (205) and engage with a second surface such as the chassis or sub-component of the printing device. The height of the hook (110) of the fastener retainer (100) as described in connection with FIG. 1, may be sufficient to retain the bolt with the gear cover (205) while still allowing the bolt to be disengaged with the chassis or sub-component of the printing device. This may include a height of the hook (110) that is equal to the length of the bolt that exceeds the thickness of the gear cover (205). This may allow the disassembly of the bolt from the chassis or sub-component of the printing device while providing vertical displacement of the bolt before abutting the hook (110). In this example, the height of the hook (110) is shorter than the length of the bolt.

In an example, the fastener (125) is a screw. The screw, after being installed into the fastener retainer (100) as described above, may interface with a chassis or other sub-component of the printing device via a threaded portion on a shaft portion (130) of the screw. The screw in this example may have a length sufficient to pass entirely though the surface (105) of the gear cover (205) and engage with a second surface such as the chassis or sub-component of the printing device. The height of the hook (110) of the fastener retainer (100) as described in connection with FIG. 1, may be sufficient to retain the screw with the gear cover (205) while still allowing the screw to be disengaged with the chassis or sub-component of the printing device. This may include a height of the hook (110) that is equal to the length of the screw that exceeds the thickness of the gear cover (205). This may allow the disassembly of the screw from the chassis or sub-component of the printing device while providing vertical displacement of the screw before abutting the hook (110). In this example, the height of the hook (110) is shorter than the length of the screw.

Figure 3:
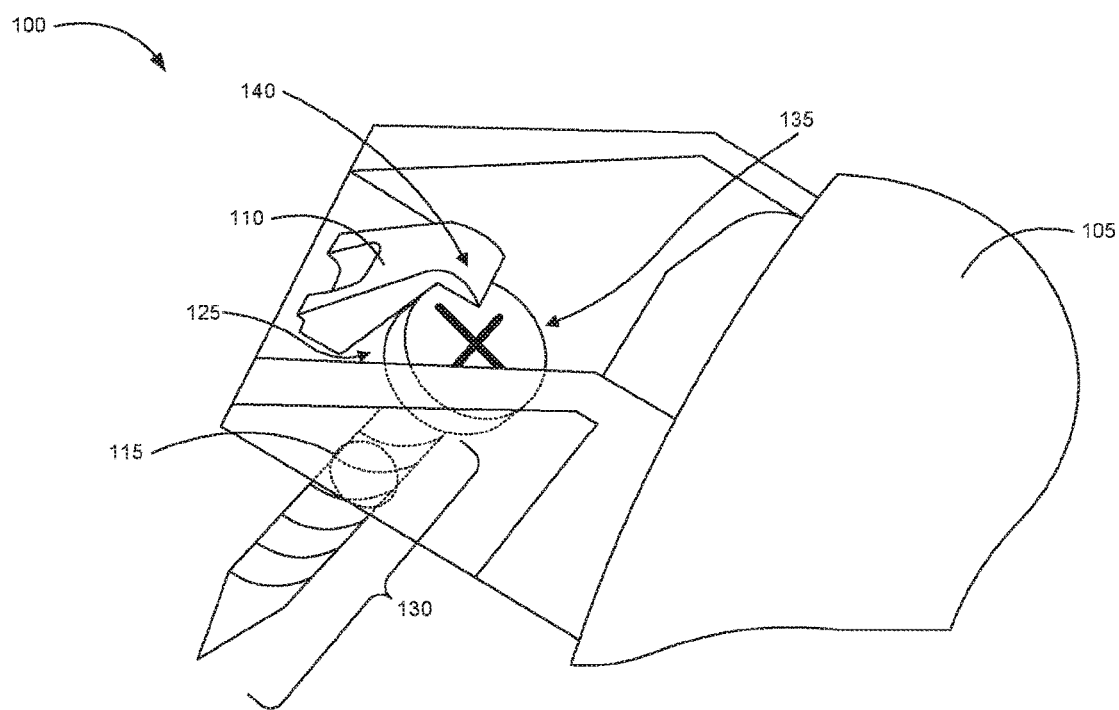
FIG. 3 is a diagram of a fastener retainer for retaining a fastener in a coupled state with respect to a surface, according to an example of the principles described herein.

FIG. 3 is a diagram of a fastener retainer (100) for retaining a fastener in a coupled state with respect to a surface, according to an example of the principles described herein. Similar to the fastener retainer (100) of FIG. 1, the fastener retainer (100) of FIG. 3 may be coupled to any surface (105) such as a sub-component of a device. In an example, the fastener retainer (100) is integral with the surface (105). The fastener retainer (100) may include a hook (110), a fastener hole (115), and a countersink (120). Each of these will now be described in more detail.

The hook (110) may be defined on a first side of the surface (105). In an example, the hook (110) protrudes perpendicularly from any portion of the surface (105). The hook (110) may be defined close to a fastener hole (115) such that when a fastener (120) such as a screw is inserted into the fastener hole (115), the hook (110) prevents the fastener (125) from de-coupling from the surface (105). Unlike the fastener retainer (100) of FIG. 1, the fastener retainer (100) of FIG. 3 does not include a countersink (FIG. 1, 120). Instead, the hook and the fastener hole (115) restrict the movement of the fastener (125) sufficiently in order to prevent the fastener (125) from decoupling from the surface (105) even when a shaft portion (130) of the fastener (125) extending out from a second side of the surface (105) is not engaged with a second surface. In this example, the height of the hook (110) protruding from the surface (105) is shorter than the length of the fastener (125) such that vertical movement of the fastener (125) out of the fastener hole (115) is prevented by the hook (110).

The surface (105) may be any surface of a part or element to be coupled to a device. In an example, the surface (105) is a subcomponent of a device installed or to be installed in a device. For example, the surface (105) may form part of a sub-component of a printing device. When the sub-component is installed in the printing device, a fastener (125) such as a screw may secure the sub-component to another component or chassis of the printing device.

During installation of the fastener (125) into the fastener retainer (100), a shaft portion (130) of the fastener (125) may be inserted into a first end of the fastener hole (115) proximate to the side of the surface (105) where the hook (110) is formed. A head portion (135) of the fastener (125) may be passed by a slopped portion (140) of the hook (110) defined on a top portion of the hook (110). In an example, this may be done by pushing the top portion of the hook (110) away from the fastener hole (115) to allow the head portion (135) to pass under the hook (110). In an example, the hook (110) may be pushed out of the way by applying pressure to a top portion of the head portion (135) causing a bottom lip portion of the head portion (135) to follow the slopped surface of the top portion of the hook (110). Because the shaft portion (130) of the fastener (125) has been inserted into the fastener hole (115), the head portion (135) of the fastener (125) will not move laterally and the force on the head portion (135) will cause the hook (110) to be laterally pushed out of the way. Once the head portion (135) clears the hook (110), the resiliency of the material that the hook (110) is made of causes the hook (110) to return to its original position.

As the fastener (125) is installed as described above, a portion of the shaft portion (130) of the fastener (125) may slidably extend out of a second end of the fastener hole (115) opposite the side of the surface (105) with the hook (110). This allows the shaft portion (130) of the fastener (125) to engage with other surfaces such as the chassis or another component of the example printing device as described above.

As the fastener (125) is disengaged from the other surface, the fastener (125) is not decoupled from the surface (105). Instead, as the shaft portion (130) of the fastener (125) disengages with the other surface, the head portion (135) of the fastener (125) advances away from the top of fastener hole (115) and advances into a space between the surface (105) and the hook (110) such that disengagement of the shaft portion (130) with the other surface is completed. However, the fastener (125) is prevented from completely exiting the fastener retainer (100) due to the lower surface of the hook (110) that prevents disablement of the fastener (125) from the surface (105). In an example, the distance from the top side of the surface (105) where the hook (110) projects from the surface (105) and the bottom side of the hook (110) is shorter than the length of the fastener (125). In an example, the length of the hook (110) measured from the surface (105) to the top of the hook (110) is longer than the length of the fastener (125), In an example, the length of the hook (110) measured from the surface (105) to the top of the hook (110) is shorter than the length of the fastener (125).

The specification and figures describe a fastener hook that prevent the fastener from decoupling from a surface the hook is integrally coupled to. The fattener retainer described herein prevents screws, bolts, and other fastening devices from decoupling from the surface during disassembly of the surface from another surface. As described above, this prevents the loss of the fastener during disassembly of the surface from another surface. Additionally, this further prevents lost fasteners from engaging with other components of a device where the fastener falls. Consequently, damage will not occur to the device due to a lost fastener damaging operating sub-components in the device. The above fastener retainer further provides for relative easier repair of a device since a repair serviceperson will not have to handle and retain fasteners during repair or replacement of the sub-component with which the fastener retainer is coupled.

The preceding description has been presented to illustrate and describe examples of the principles described. This description is not intended to be exhaustive or to limit these principles to any precise form disclosed. Many modifications and variations are possible in light of the above teaching.

What is claimed is:
1. A fastener retainer, comprising:
a surface;
a hook integrated into the surface;
a fastener hole defined in the surface below the hook; and
a countersink formed radially around the fastener hole, the countersink to cooperate with the hook to retain a fastener that is being secured in, or removed from, the fastener hole by limiting lateral movement of the fastener.

2. The fastener retainer of claim 1, wherein the hook is made of a resilient material that allows a screw to be placed in the fastener hole but not removed.

3. The fastener retainer of claim 2, wherein the height of the hook relative to the surface is at least shorter than a length of the fastener.

4. The fastener retainer of claim 1, wherein the countersink extends entirely around the fastener hole except for where the hook extends from the surface.

5. The fastener retainer of claim 1, wherein a top surface of the hook distal from the surface is sloped towards the fastener hole.

6. The fastener retainer of claim 5, wherein a bottom surface of the hook is parallel to the surface.

7. The fastener retainer of claim 1, wherein the height of the hook relative to the surface is at least shorter than the length of the fastener and long enough to allow disengagement of a threaded surface of a fastener from a workpiece opposite the surface from which the hook extends.

8. The fastener retainer of claim 1, wherein the countersink is formed radially over 180 degrees around the fastener hole.

9. The fastener retainer of claim 1, wherein the countersink is formed radially around a portion of the fastener hole and located opposite the hook with respect to the fastener hole.

10. The fastener retainer of claim 1, wherein the countersink comprises a number of radially formed pegs formed around the fastener hole.

11. A printing device comprising:
a printing device chassis comprising a gear cover;
a hook extending out of and integrated into a first side of a substrate of the gear cover;
a fastener hole defined through the substrate;
a countersink formed radially around the fastener hole, the countersink to cooperate with the hook to retain a fastener that is being secured in, or removed from, the fastener hole by limiting lateral movement of the fastener.

12. The printing device of claim 11, wherein the countersink formed below the hook is integral to the substrate and forms a partial cylinder.

13. The printing device of claim 11, wherein the substrate further comprises a screw hole and wherein threads of a screw are passed through the screw hole with a head of the screw below the hook.

14. The printing device of claim 13, wherein installation of the screw in the screw hole comprises elastically bending the hook to pass the head of the screw below the hook.

15. The printing device of claim 14, wherein installation of the screw allows for threads of the screw to engage a surface opposite the substrate and secure the substrate to the surface.

16. The printing device of claim 15, wherein disassembly of the screw from the surface causes the screw to remain coupled to the substrate while disengaging the substrate from the surface.

17. The printing device of claim 11, wherein the countersink is formed at least equal to a height of the hook on the first side of the substrate.

* * * * *